(12) United States Patent
Geiser et al.

(10) Patent No.: US 10,690,195 B2
(45) Date of Patent: Jun. 23, 2020

(54) THRUST BEARING ASSEMBLY ATTACHMENT

(71) Applicant: Schaeffler Technologies AG & Co. KG, Herzogenaurach (DE)

(72) Inventors: Jordan Geiser, Dalton, OH (US); Michael Hodge, Creston, OH (US)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 338 days.

(21) Appl. No.: 15/671,545

(22) Filed: Aug. 8, 2017

(65) Prior Publication Data
US 2019/0048944 A1 Feb. 14, 2019

(51) Int. Cl.
*F16D 23/14* (2006.01)
*F16C 35/067* (2006.01)
*F16C 33/58* (2006.01)
*F16C 19/54* (2006.01)
*F16C 35/06* (2006.01)

(52) U.S. Cl.
CPC .............. *F16D 23/14* (2013.01); *F16C 19/54* (2013.01); *F16C 33/586* (2013.01); *F16C 35/061* (2013.01); *F16C 35/067* (2013.01); *F16C 2226/74* (2013.01); *F16C 2361/43* (2013.01)

(58) Field of Classification Search
CPC ........ F16D 23/14; F16C 19/54; F16C 35/061; F16C 2226/74; F16C 2361/43
See application file for complete search history.

(56) References Cited

U.S. PATENT DOCUMENTS

| 4,480,440 | A | 11/1984 | Harper et al. |
| 5,918,987 | A | 7/1999 | Sundquist et al. |
| 9,145,927 | B2 | 9/2015 | Luipold et al. |

FOREIGN PATENT DOCUMENTS

| EP | 2522871 A1 | 11/2012 |
| JP | 2008045691 A | 2/2008 |

*Primary Examiner* — Huan Le
(74) *Attorney, Agent, or Firm* — Volpe and Koenig, P.C.

(57) ABSTRACT

A transmission assembly, for example a clutch carrier assembly including a clutch carrier, a first thrust bearing, and a second thrust bearing is provided with integrated assembly structures. A connector extends from a race of the first thrust bearing, through the clutch carrier, and engages a receiver on a race of the second thrust bearing.

12 Claims, 5 Drawing Sheets

US 10,690,195 B2

THRUST BEARING ASSEMBLY ATTACHMENT

FIELD OF INVENTION

The present invention relates to a bearing arrangement, and more particularly to roller thrust bearings with improved interconnection for a transmission or carrier assembly.

BACKGROUND

Roller thrust bearings are known and used in a variety of applications for supporting axial loads. Such applications may include a transmission plate, an automatic transmission clutch carrier, a planet gear carrier, a ring gear carrier, and other automatic transmission components that require at least one thrust bearing. In an assembly of, for example, a clutch carrier of an automatic transmission, a roller thrust bearing is mounted on each side of a clutch carrier. Roller thrust bearings typically include rolling elements, two rings that define races for the rolling elements, and a cage including pockets for carrying the rolling elements. An inner race of each roller thrust bearing is mounted to the carrier assembly.

A vendor or end-user may be required to assemble the separate parts of the clutch carrier assembly, which may be difficult, time consuming, expensive, and introduce user error. The fastening or mounting mechanism used to attach the thrust bearings to the clutch carrier may obstruct operation of the clutch carrier assembly. It would be desirable to provide a carrier assembly arrangement that is easily assembled at low cost.

SUMMARY

Briefly stated, a clutch carrier assembly is provided. The clutch carrier assembly includes a clutch carrier, a first thrust bearing, and a second thrust bearing. The clutch carrier has a plurality of circumferentially arranged access holes. The first thrust bearing has a plurality of axially extending connectors. The second thrust bearing has a plurality of receivers. The connectors pass through the access holes to engage the receivers.

BRIEF DESCRIPTION OF THE DRAWINGS

The foregoing Summary and the following detailed description will be better understood when read in conjunction with the appended drawings, which illustrate a preferred embodiment of the invention. In the drawings.

DETAILED DESCRIPTION OF THE PREFERRED EMBODIMENTS

Figure 1:
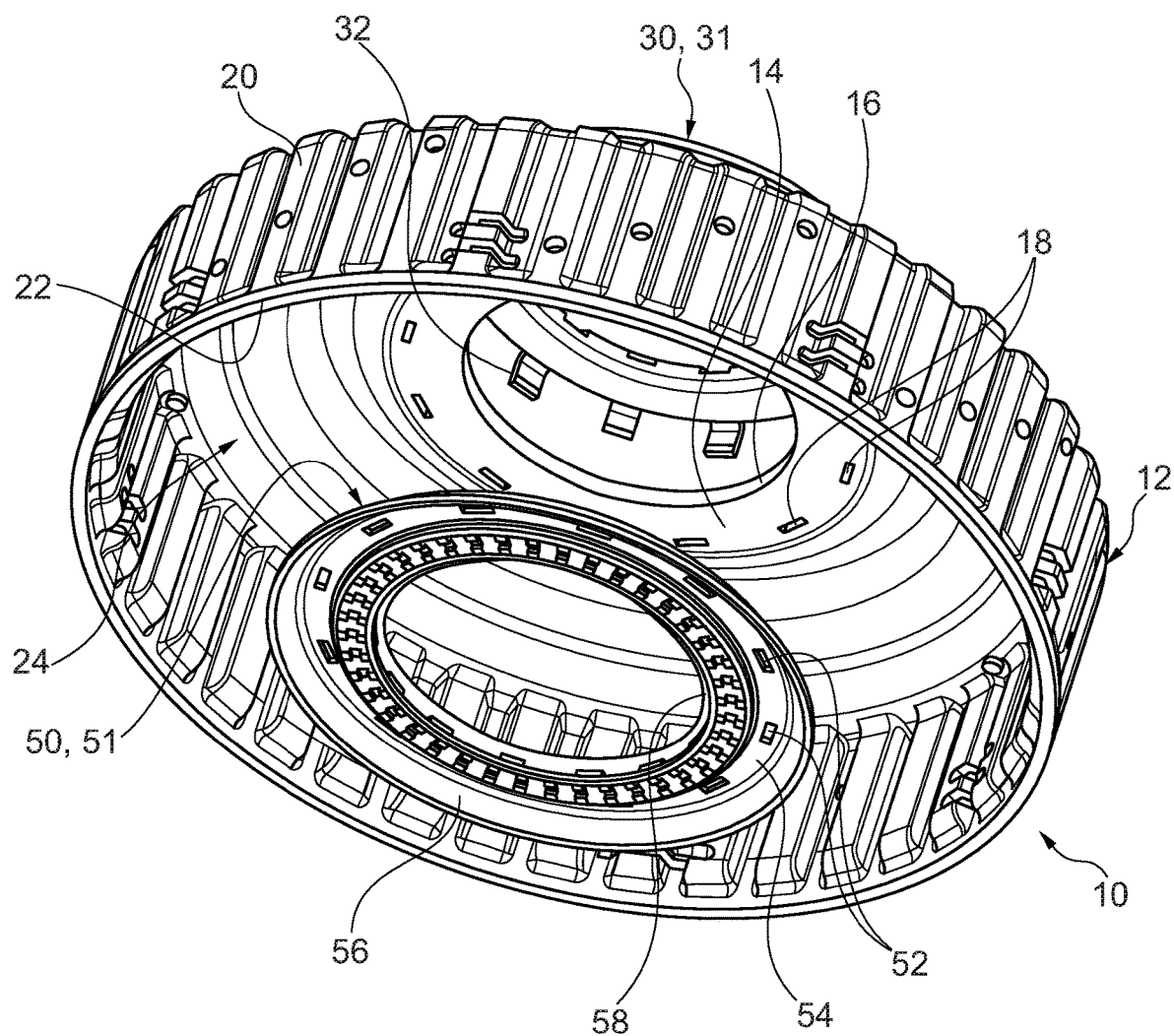
FIG. 1 is an exploded perspective view of a clutch carrier assembly.
Figure 2:
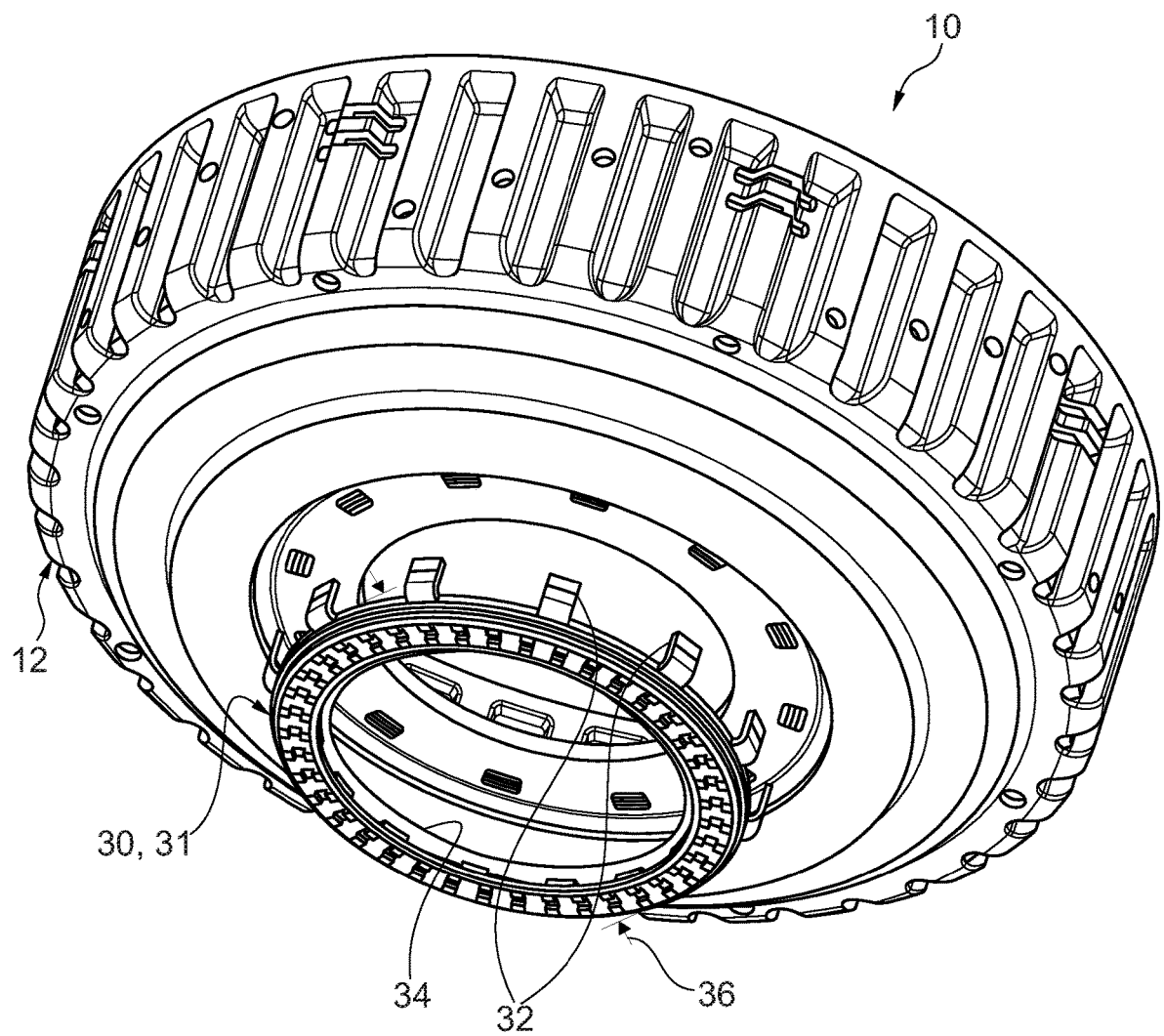
FIG. 2 is another exploded perspective view of the clutch carrier assembly of FIG. 1 from the opposite side.
Figure 3:
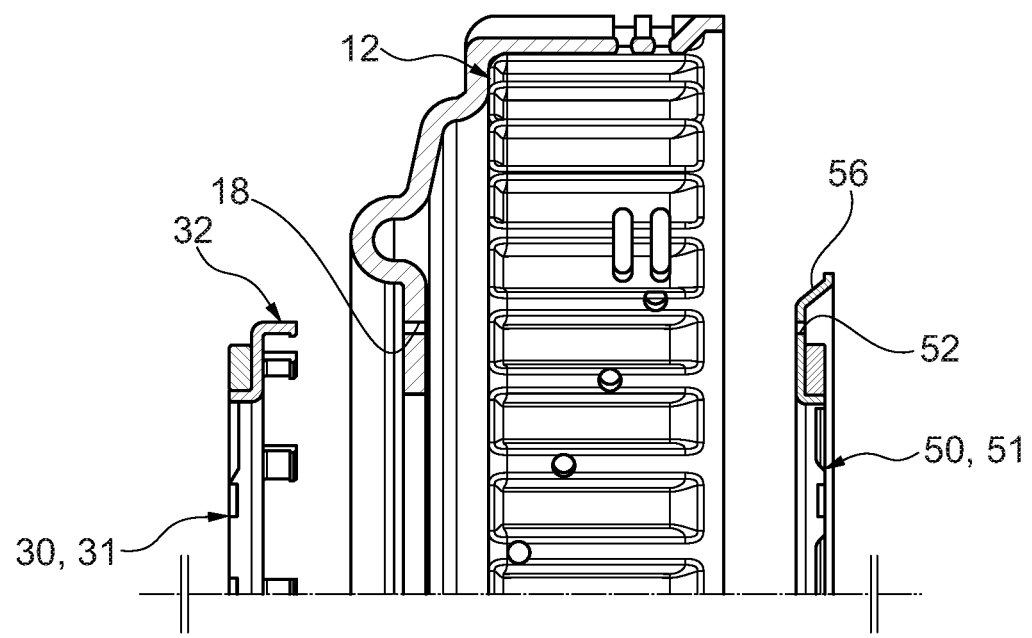
FIG. 3 is an exploded side view, in cross-section, of the clutch carrier assembly of FIG. 1.
Figure 4A:
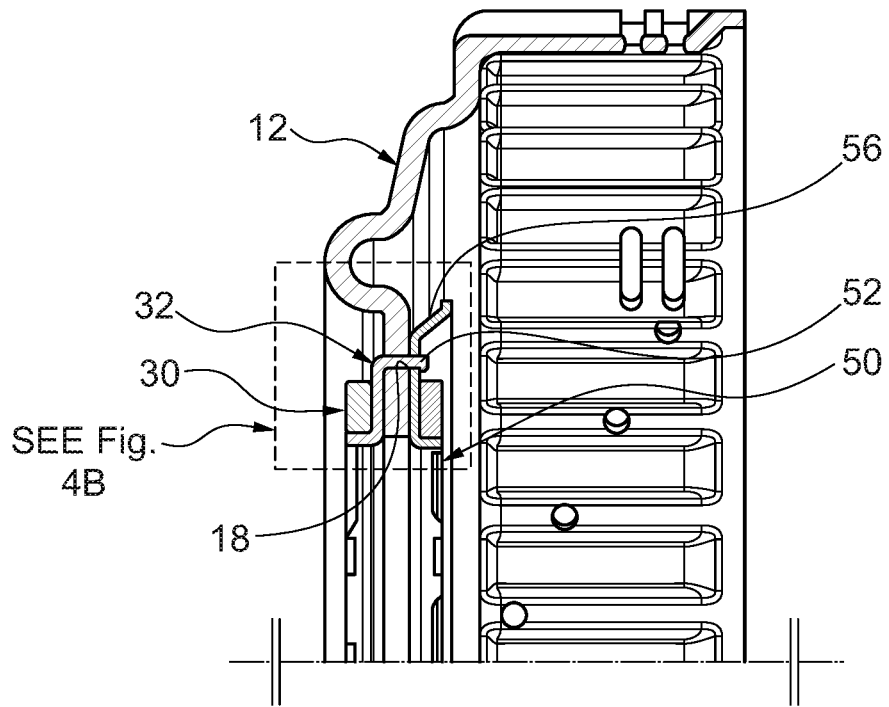
FIG. 4A is an assembled side view, in cross-section, of the clutch carrier assembly of FIG. 1.
Figure 4B:
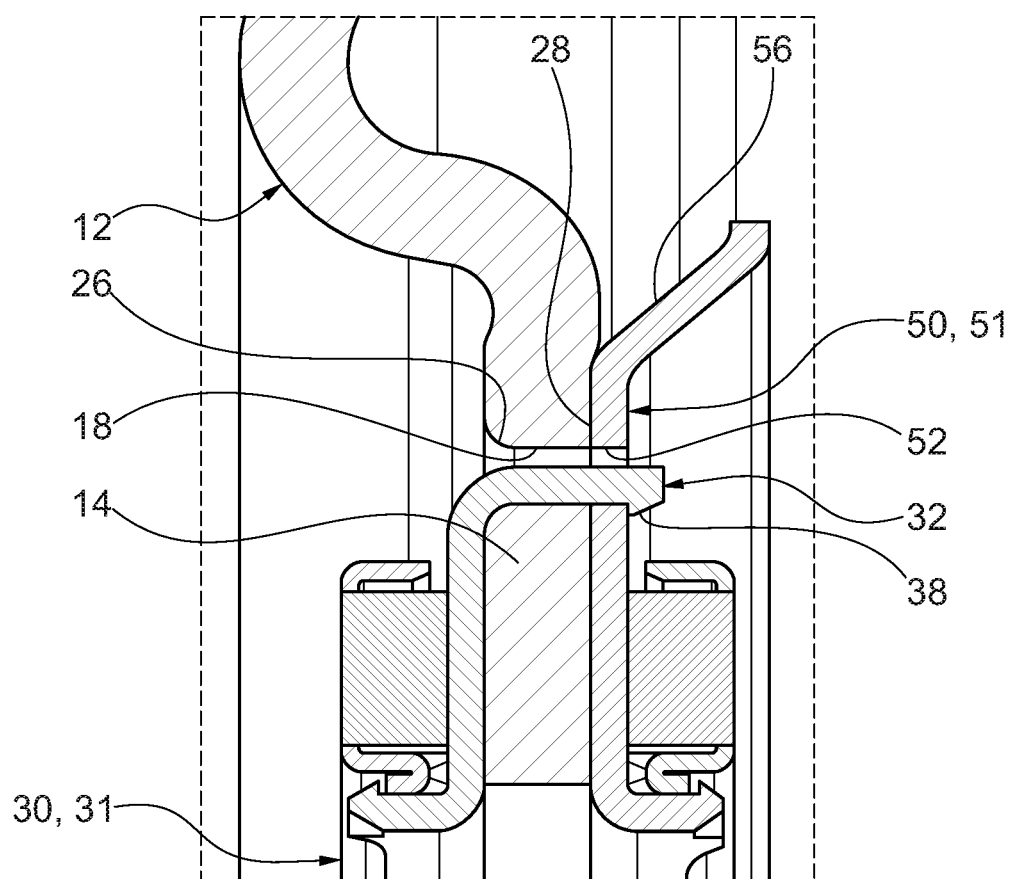
FIG. 4B is an enlarged detail view of the clutch carrier assembly taken from FIG. 4A.

At the outset, it should be appreciated that like drawing numbers appearing in different drawing views identify identical, or functionally similar, structural elements. Furthermore, it is understood that this invention is not limited only to the particular embodiments, methodology, materials and modifications described herein, and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the following example methods, devices, and materials are now described.

Certain terminology is used in the following description for convenience only and is not limiting. The words "front," "rear," "upper" and "lower" designate directions in the drawings to which reference is made. The words "radially inwardly" and "radially outwardly" refer to directions radially toward and away from an axis of the part being referenced. "Axially" refers to a direction along the axis of a shaft or other part. A reference to a list of items that are cited as "at least one of a, b, or c" (where a, b, and c represent the items being listed) means any single one of the items a, b, or c, or combinations thereof. The terminology includes the words specifically noted above, derivatives thereof and words of similar import.

The present disclosure relates to a clutch carrier assembly for an automatic transmission of, e.g., a vehicle, with thrust bearings for accommodating axially-applied loads. The clutch carrier assembly includes a clutch carrier, a first thrust bearing having a race, and a second thrust bearing having a second race. The first and second thrust bearings have connectors and receivers shaped and arranged to allow for relatively simple and easy assembly.

Referring to FIG. 1, a clutch carrier assembly 10 is shown. The clutch carrier assembly 10 includes a clutch carrier 12, a first thrust bearing race 50, and a second thrust bearing race 30.

The clutch carrier 12 is substantially circular, and has an inner wall 14 with an opening defined by an inner diameter 16 at one axial end thereof. A plurality of access holes 18 are spaced circumferentially about the inner wall 14. A sidewall 20 extends axially and defines an outer diameter 22 at a second axial end of the clutch carrier 12. The clutch carrier 12 defines a volume 24 inside the sidewall 20, inner wall 14, and transitional surfaces therebetween (not labeled). In alternative embodiments for other transmission parts, a transmission plate may be arranged similarly to the clutch carrier 12, having an arrangement of access holes 18 without necessarily including the sidewall 20 and transitional surfaces.

Figure 5A:
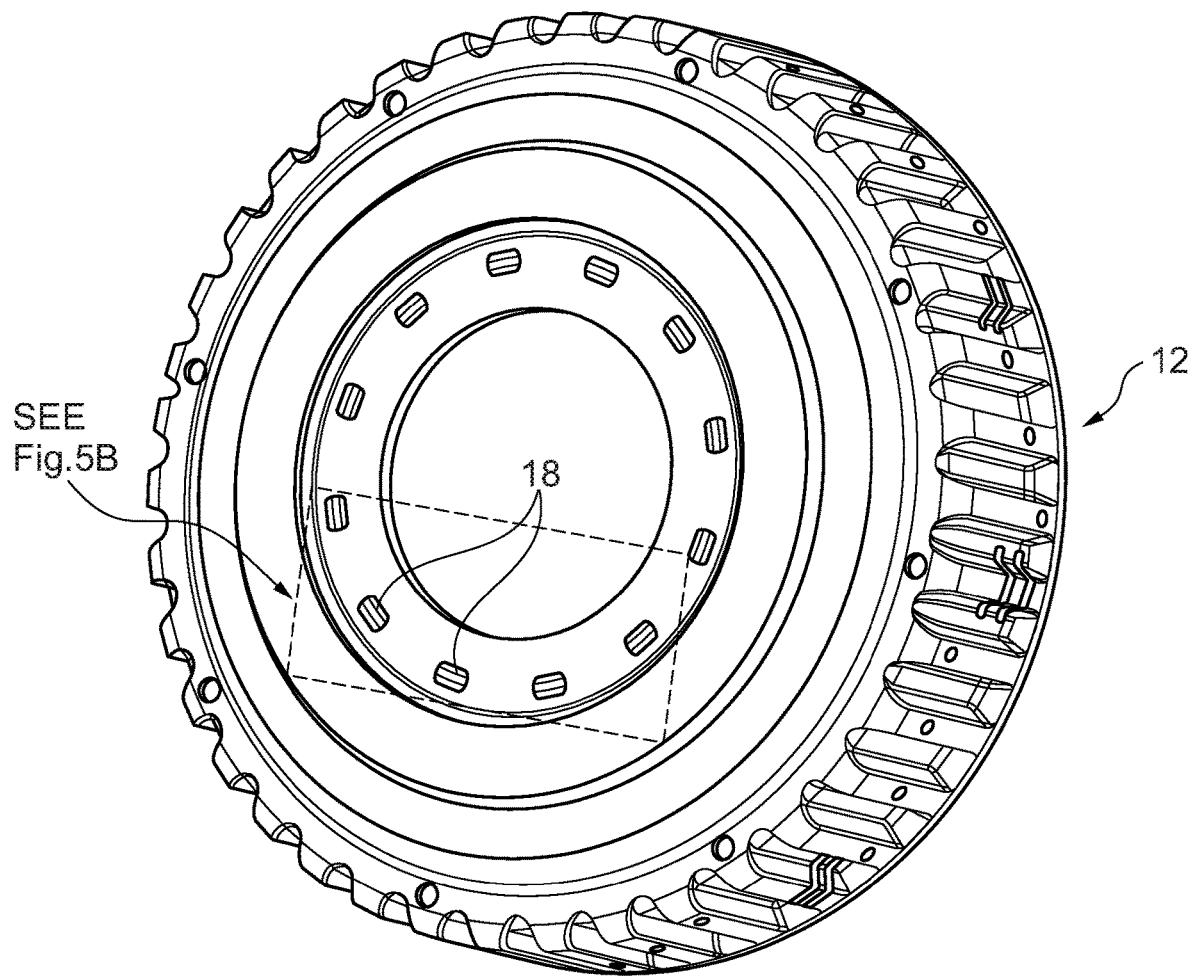
FIG. 5A is a perspective view of a clutch carrier of the clutch carrier assembly of FIG. 1.
Figure 5B:
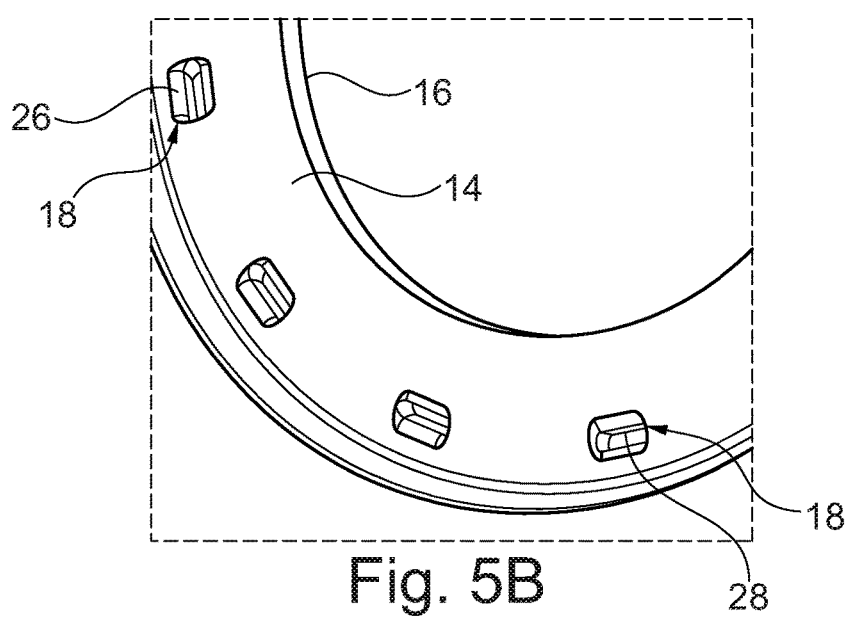
FIG. 5B is an enlarged detail view of the clutch carrier taken from FIG. 5A.

As best shown in FIG. 5B, the plurality of access holes 18 of the clutch carrier 12 may have chamfers 26 on one side for aiding the insertion of a connector as discussed below. The access holes 18 may also have an edge 28 that is generally or substantially flat on an opposite side from the chamfers 26.

As shown in FIGS. 2-4B, the first thrust bearing race 30 includes a plurality of tabs or connectors 32 circumferentially spaced. The tabs 32 extend generally axially toward the clutch carrier 12 and the second thrust bearing race 50. The tabs 32 in a preferred embodiment are integrally formed with the first thrust bearing race 30. The tabs 32 are illustrated as substantially rectangular in cross-section, but may be generally oval and/or have a slight longitudinal curve reflecting the circumference of the first thrust bearing race 30.

The first thrust bearing race 30 defines an opening with an inner diameter 34 and has an outer diameter 36. A catch 38 is provided on a distal end of each tab 32. The first thrust bearing race 30 is preferably formed from stamped bearing grade sheet metal.

Referring to FIG. 1, the second thrust bearing race 50 includes a plurality of slots or receivers 52 circumferentially spaced. The slots 52 are positioned on a medial surface 54 that may be generally or substantially planar. An optional oil deflector 56 circumscribes the second thrust bearing race 50 at an axial angle to direct oil flow to a specific predetermined region of the clutch carrier assembly 10. The second thrust bearing race 50 defines an opening with an inner diameter 58. The second thrust bearing race 50 is preferably formed from stamped bearing grade sheet metal.

As shown in FIGS. 1 and 3-4B, the slots 52 are illustrated as substantially rectangular, but may be generally oval and/or have a slight longitudinal curve reflecting the circumference of the second thrust bearing race 50. Overall, the slots 52 are sized and shaped to complement the tabs 32 and provide a tight fit. In a preferred embodiment, the slots 52 are formed by being punched in the second thrust bearing race 50 such that they are integrally formed with the second thrust bearing race, as part of the stamping and forming process for the second thrust bearing race.

The first and second thrust bearing races 30, 50 are each a part of a respective first and second thrust bearing 31, 51. As such, in a general sense, the tabs 32 extend from the first thrust bearing 31 and the slots 52 are formed in the second thrust bearing 51. The first and second thrust bearings 31, 51, may also each include caged rolling elements (not shown).

When assembled, the clutch carrier 12, first thrust bearing race 30, and second thrust bearing race 50 are axially aligned. The clutch carrier 12 is positioned between the first thrust bearing race 30 and the second thrust bearing race 50. The tabs 32 pass through the access holes 18 and the slots 52, such that the catches 38 of the tabs 32 engage the edges 28 of the slots 52. The tabs 32 are sized such that assembly results in a tight, positive engagement among the clutch carrier 12, first thrust bearing race 30, and second thrust bearing race 50, thus preventing any knocking or shock loading when axial loads are applied to the clutch carrier assembly 10.

For use, a vendor or end user assembles together the clutch carrier 12, first thrust bearing race 30, and second thrust bearing race 50, such that the clutch carrier assembly 10 may be installed into a vehicle as a single unit. Both the first and second thrust bearing races 30, 50 positively engage the clutch carrier 12 so as to bear axial loads applied to the clutch carrier assembly 10.

One skilled in the art should appreciate that the respective inner diameters 16, 36, and 58 of the opening in the clutch carrier 12, first thrust bearing race 30, and second thrust bearing race 50, may be substantially equal in length. Alternatively, the inner diameter 16 of the opening in the clutch carrier 12 may be smaller or larger than the other inner diameters 34, 58. Although the illustrated embodiment shows equidistant circumferential spacing of the access holes 18, tabs 32, and slots 52, various arrangements are contemplated, so long as the clutch carrier assembly 10 is sufficiently held together and rotationally fixed.

In alternative embodiments, the tabs 32 and slots 52 may be reversed, such that the first thrust bearing race 30 has slots and the second thrust bearing race 50 has tabs. The catch 38 may have various shapes to engage the slots 52 and medial surface 54 of the second thrust bearing race 50, and the slots 52 and/or medial surface 54 may include complementary shapes. Moreover, interlocking or friction-increasing structure may be provided at the catch 38 and/or the contacted portions of the slots 52 and medial surface 54.

The disclosed clutch carrier assembly 10 provides a structure which is easily assembled and is easily installed into a transmission. The clutch carrier assembly 10 also simplifies manufacturing and minimizes the number of total parts. Moreover, the respective inner diameters 16, 34, and 58 of the clutch carrier and the races are unobstructed by any fastening mechanism.

Having thus described the present invention in detail, it is to be appreciated and will be apparent to those skilled in the art that many physical changes, only a few of which are exemplified in the detailed description of the invention, could be made without altering the inventive concepts and principles embodied therein. It is also to be appreciated that numerous embodiments incorporating only part of the preferred embodiment are possible which do not alter, with respect to those parts, the inventive concepts and principles embodied therein. In particular, the clutch carrier of the illustrated embodiments may be substituted with any transmission plate. The present embodiment and optional configurations are therefore to be considered in all respects as exemplary and/or illustrative and not restrictive, the scope of the invention being indicated by the appended claims rather than by the foregoing description, and all alternate embodiments and changes to this embodiment which come within the meaning and range of equivalency of said claims are therefore to be embraced therein.

PARTS LIST

10. Clutch Carrier Assembly
12. Clutch Carrier
14. Inner Wall
16. Inner Diameter
18. Access Holes
20. Sidewall
22. Outer Diameter
24. Volume
26. Chamfer
28. Edge
30. First Thrust Bearing Race
31. First Thrust Bearing
32. Tabs
34. Inner Diameter
36. Outer Diameter
38. Catch
50. Second Thrust Bearing Race
51. Second Thrust Bearing
52. Slots
54. Medial Surface
56. Oil Deflector
58. Inner Diameter

What is claimed is:

1. A transmission assembly comprising:
a transmission plate having a plurality of circumferentially arranged access holes;
a first thrust bearing having a plurality of axially extending connectors; and
a second thrust bearing having a plurality of receivers;
wherein the connectors pass through the access holes to engage the receivers, wherein the first thrust bearing and the second thrust bearing are mounted on opposite axial sides of a portion of the transmission plate.

2. The transmission assembly of claim 1, wherein the transmission plate is a clutch carrier.

3. The transmission assembly of claim 2, wherein the first thrust bearing is mounted outside the clutch carrier and the second thrust bearing is mounted inside the clutch carrier.

4. The transmission assembly of claim 2, wherein the second thrust bearing includes an oil deflector for directing an oil flow about the clutch carrier.

5. The transmission assembly of claim 2, wherein the first thrust bearing is positioned axially outward of the clutch carrier, and the second thrust bearing is positioned axially inward of the clutch carrier.

6. The transmission assembly of claim 2, wherein the first thrust bearing is positioned axially inward of the clutch carrier, and the second thrust bearing is positioned axially outward of the clutch carrier.

7. The transmission assembly of claim 6, wherein the receivers are slots formed in the second thrust bearing.

8. The transmission assembly of claim 1, wherein the connectors are tabs integrally formed with the first thrust bearing.

9. The transmission assembly of claim 1, wherein the plurality of connectors are mounted on a race of the first thrust bearing and the plurality of receivers are located on a race of the second thrust bearing.

10. A transmission assembly comprising:
a transmission plate having a plurality of circumferentially arranged access holes;
a first thrust bearing having a plurality of axially extending connectors; and
a second thrust bearing having a plurality of receivers;
wherein the connectors pass through the access holes to engage the receivers,
wherein the first thrust bearing and the second thrust bearing are mounted on opposite axial sides of a portion of the transmission plate,
the transmission plate is a clutch carrier,
the first thrust bearing is positioned axially inward of the clutch carrier, and the second thrust bearing is positioned axially outward of the clutch carrier, and
the connectors each having a distal catch for positively engaging the second thrust bearing.

11. A transmission assembly comprising:
a transmission plate having a plurality of circumferentially arranged access holes;
a first thrust bearing having a plurality of axially extending connectors; and
a second thrust bearing having a plurality of receivers;
wherein the connectors pass through the access holes to engage the receivers,
wherein the access holes are chamfered facing the first thrust bearing and flat facing the second thrust bearing.

12. The transmission assembly of claim 9, wherein the plurality of connectors are integrally formed with the race of the first thrust bearing, and the plurality of receivers are punched in the race of the second thrust bearing.

* * * * *